Nov. 7, 1950  C. E. SCHOU  2,529,423
TRANSMISSION MECHANISM
Filed Jan. 14, 1948  18 Sheets-Sheet 17

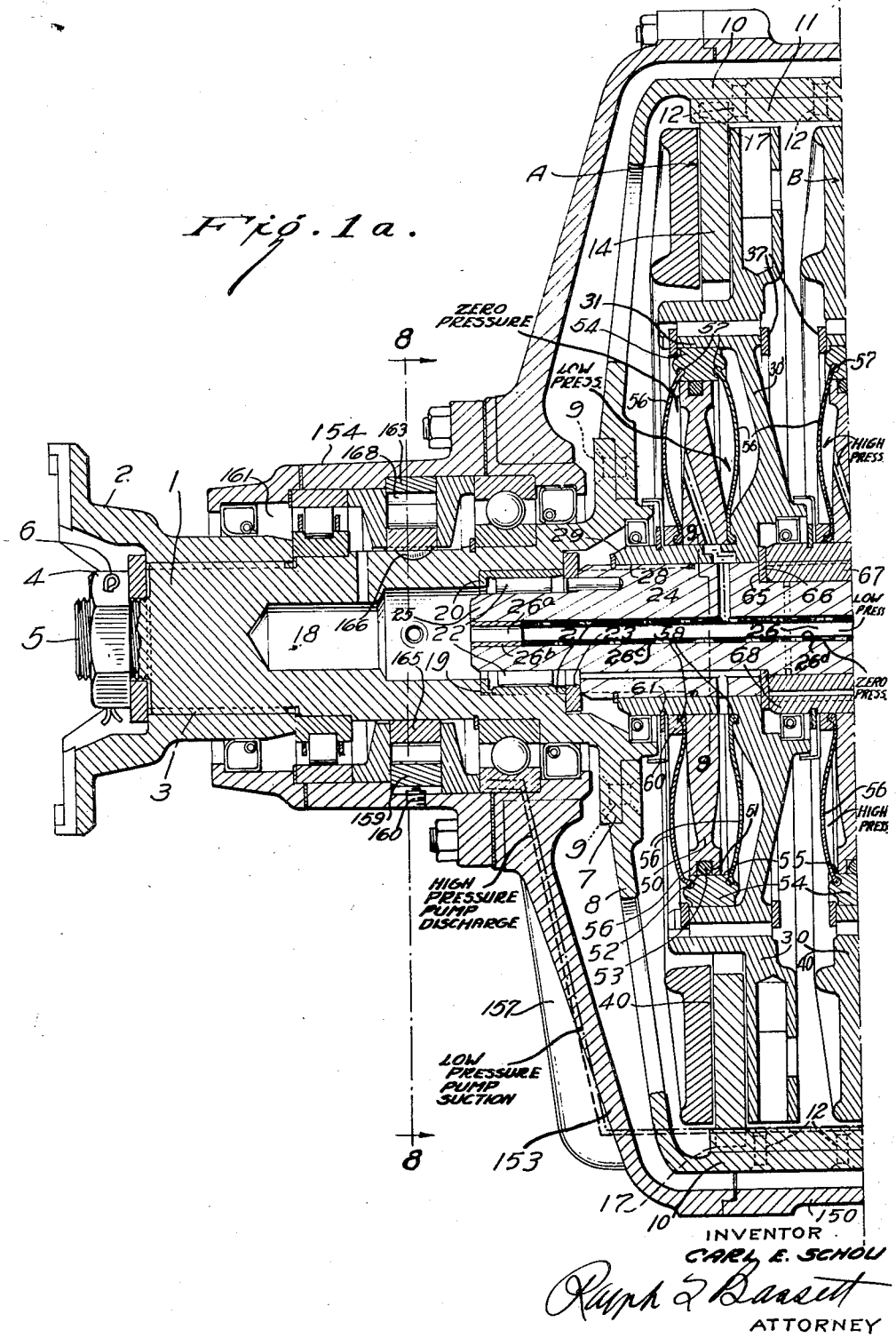

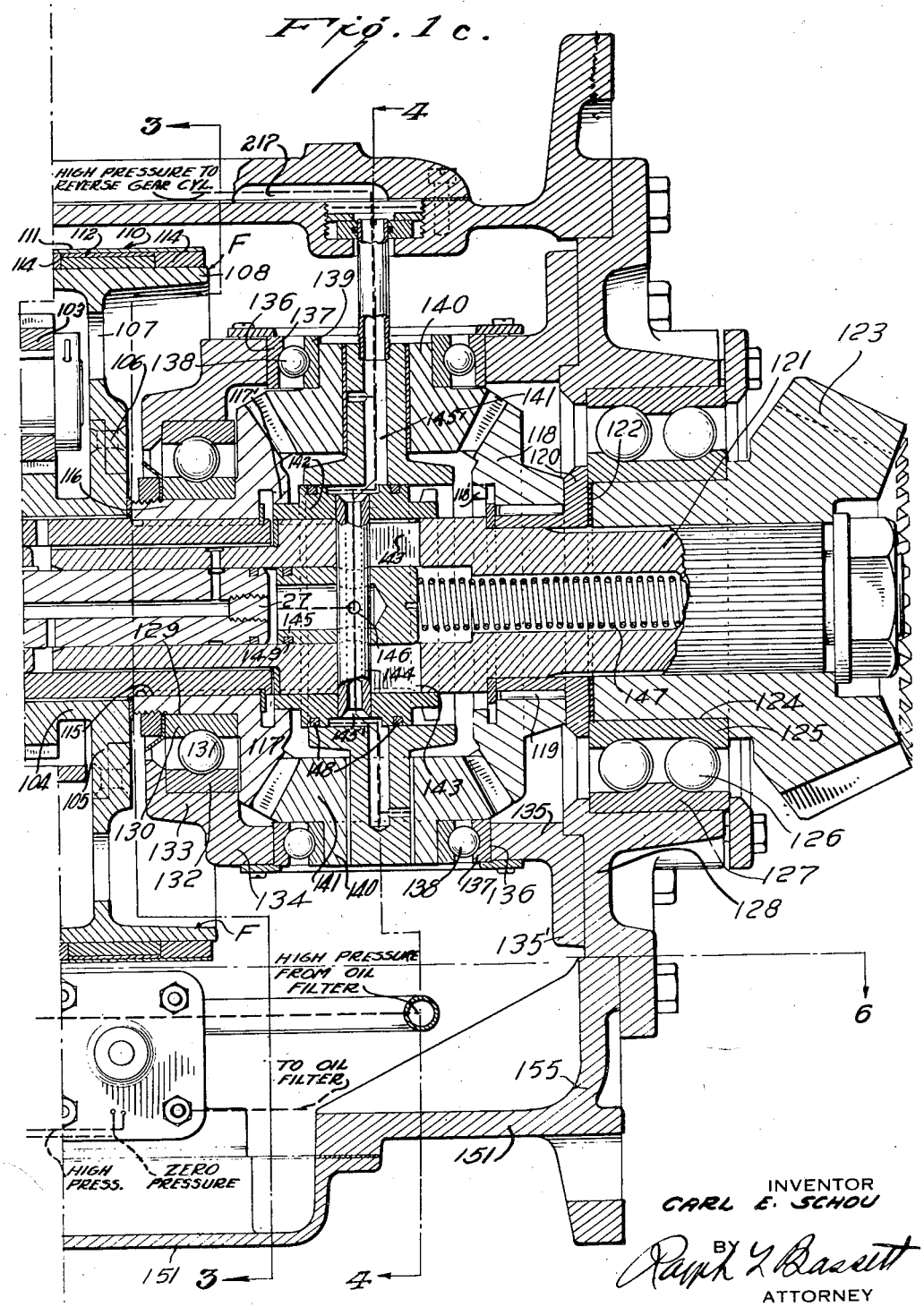

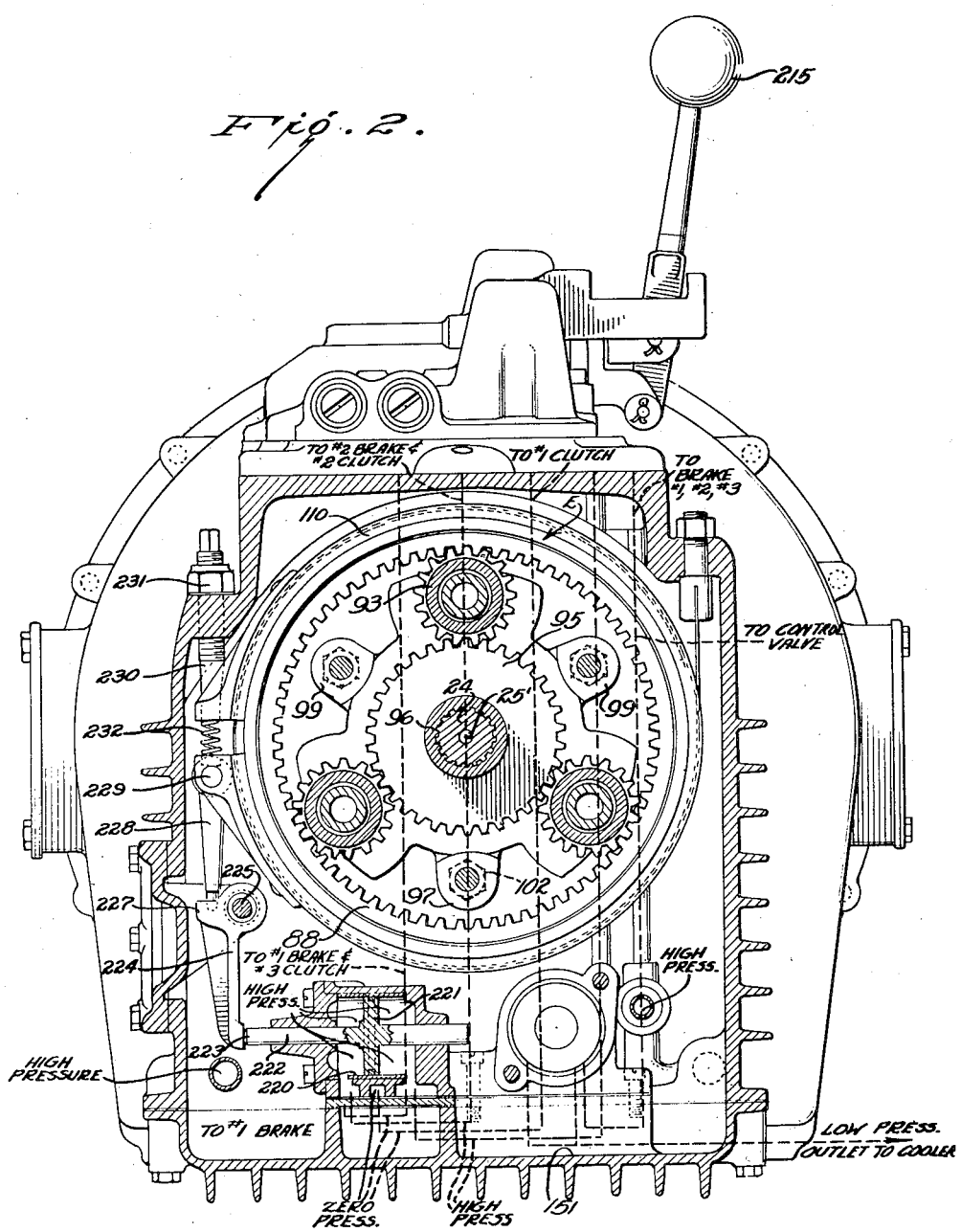

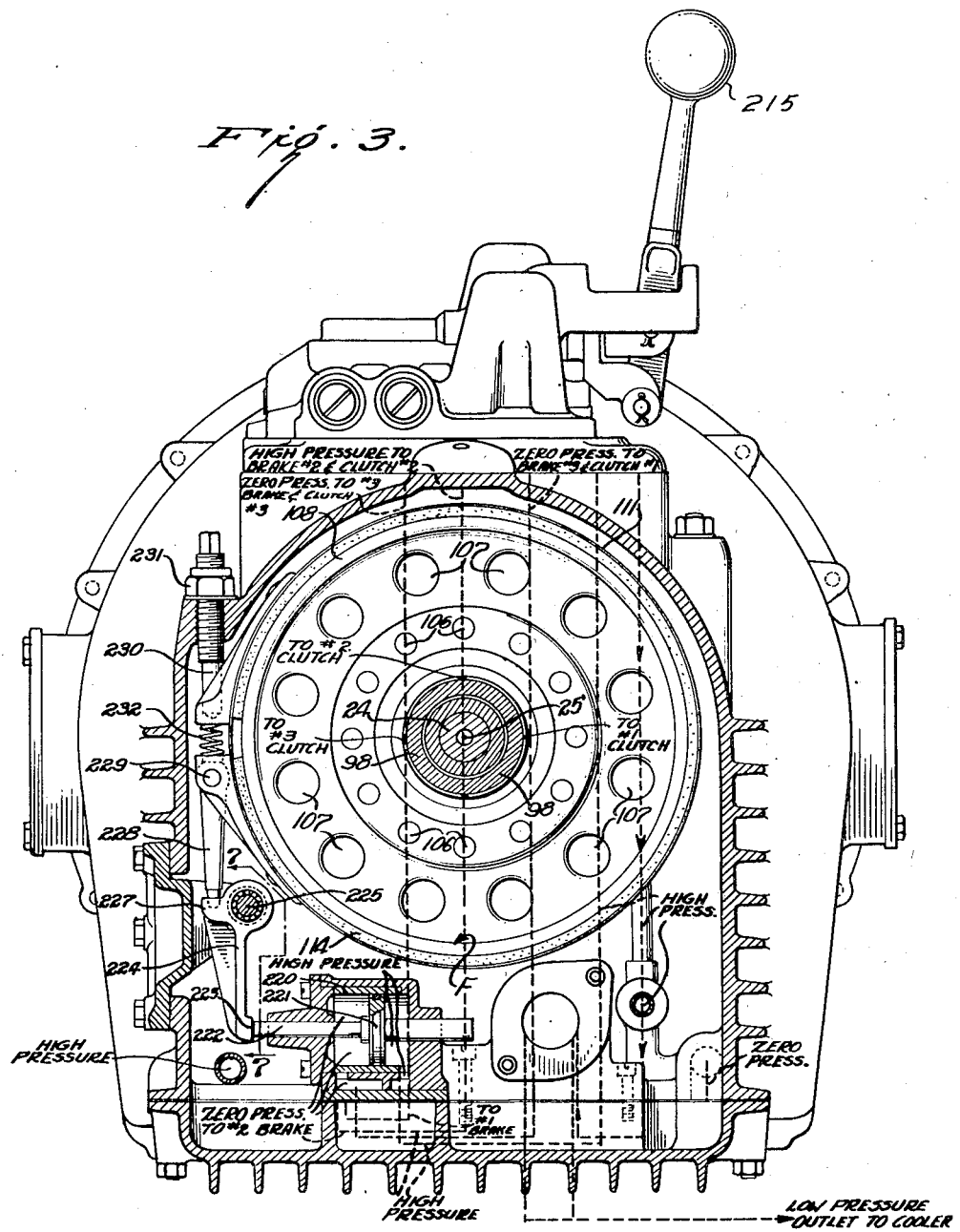

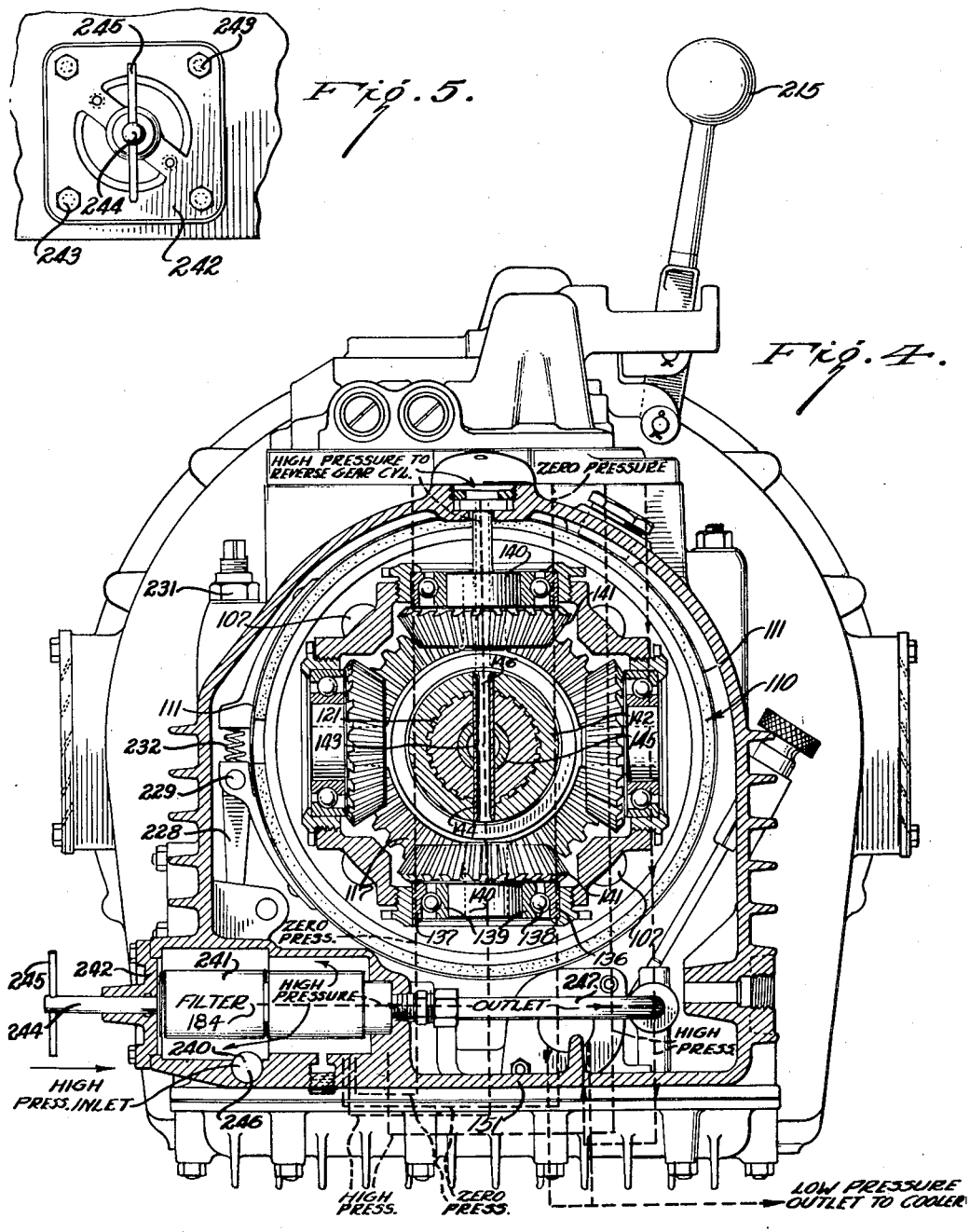

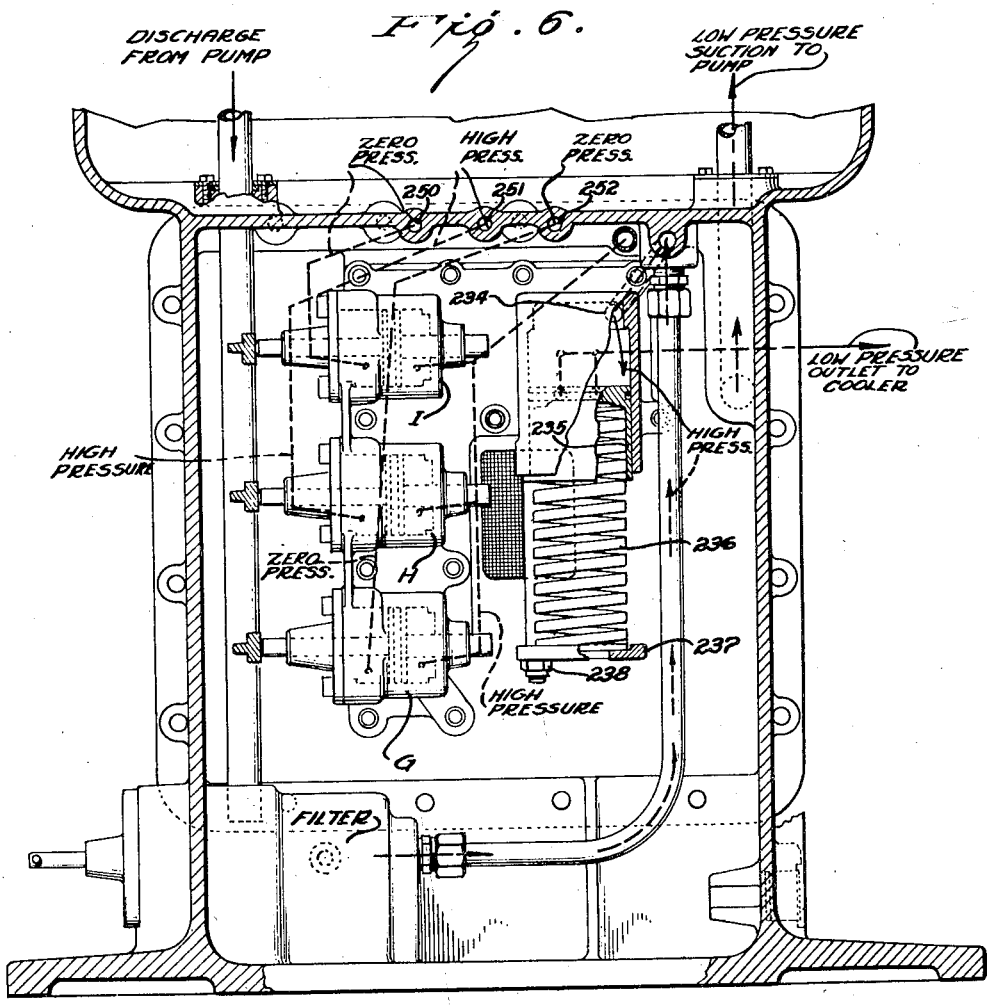
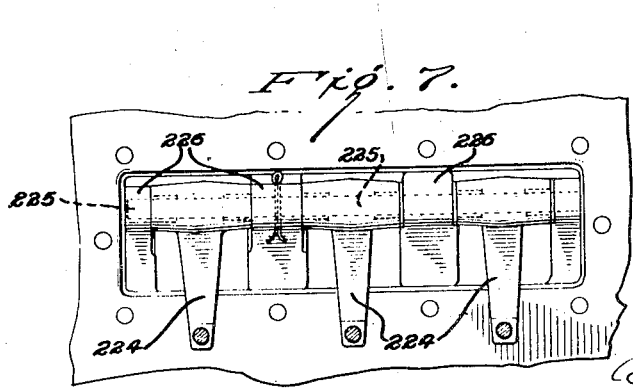

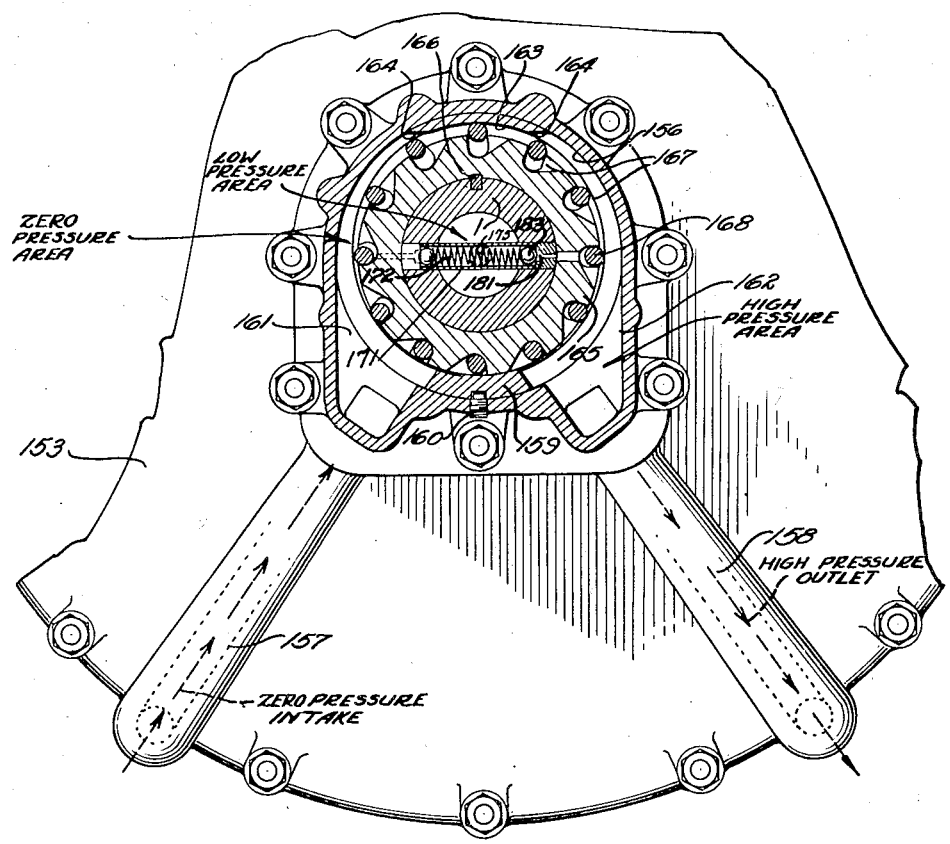

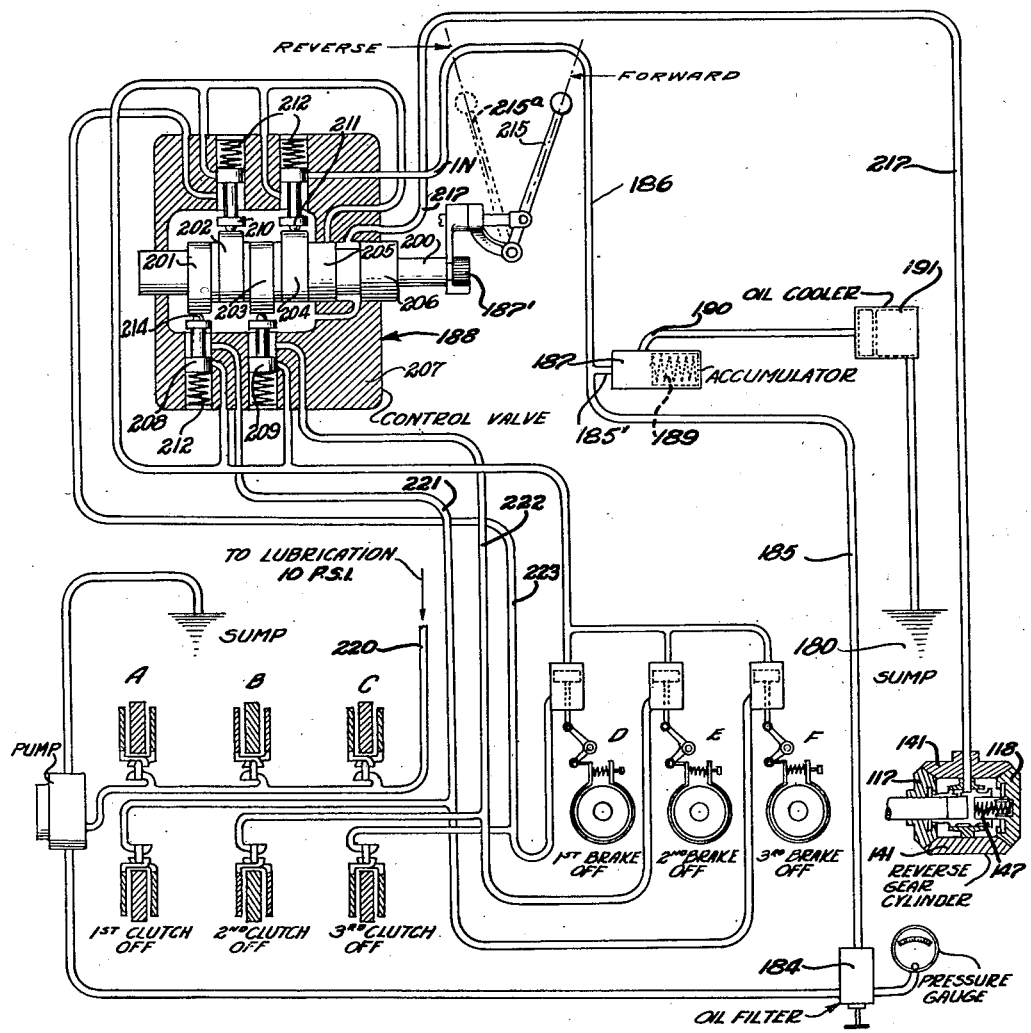
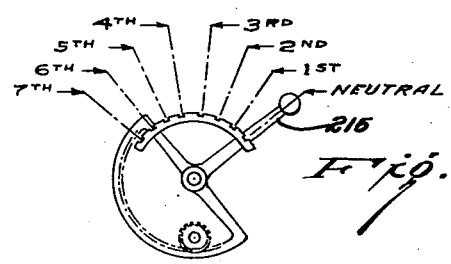

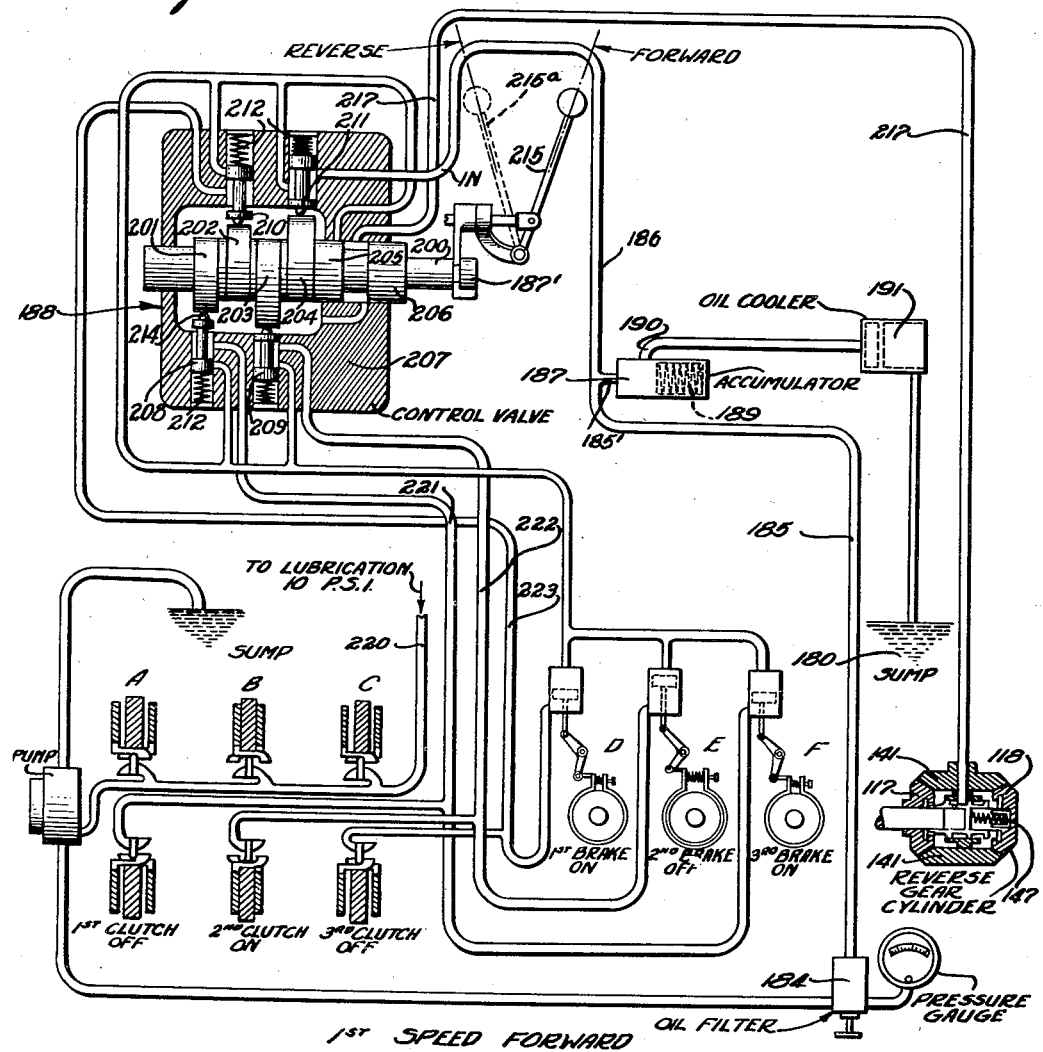

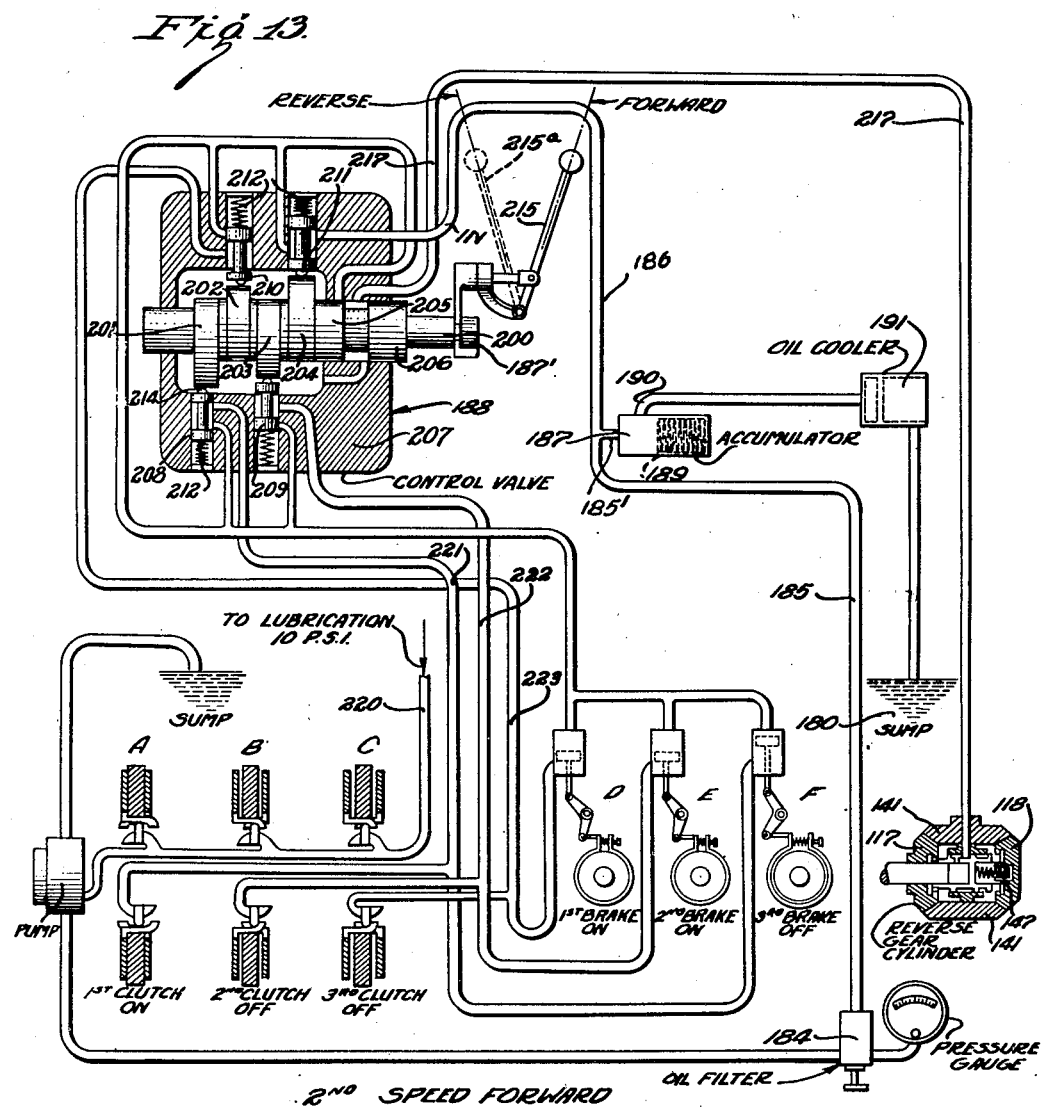

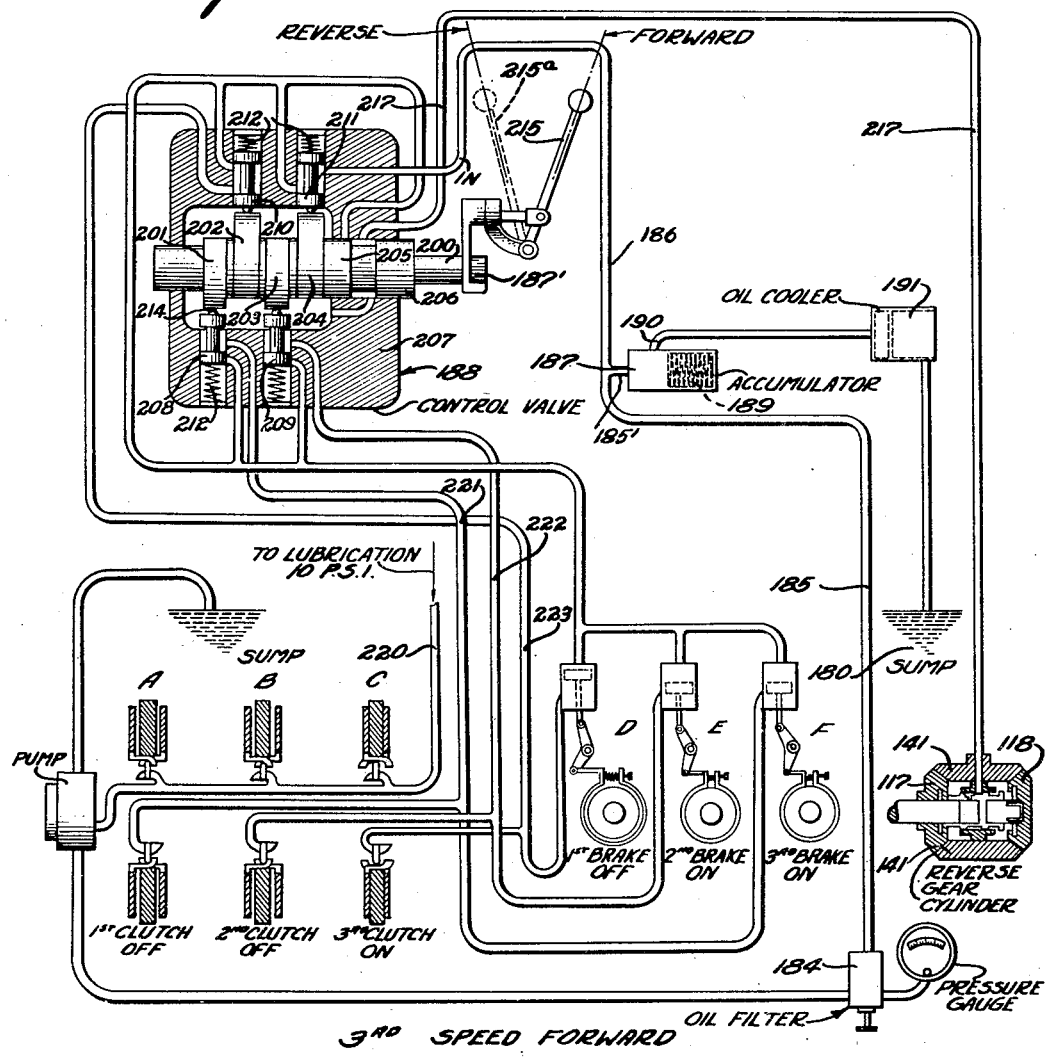

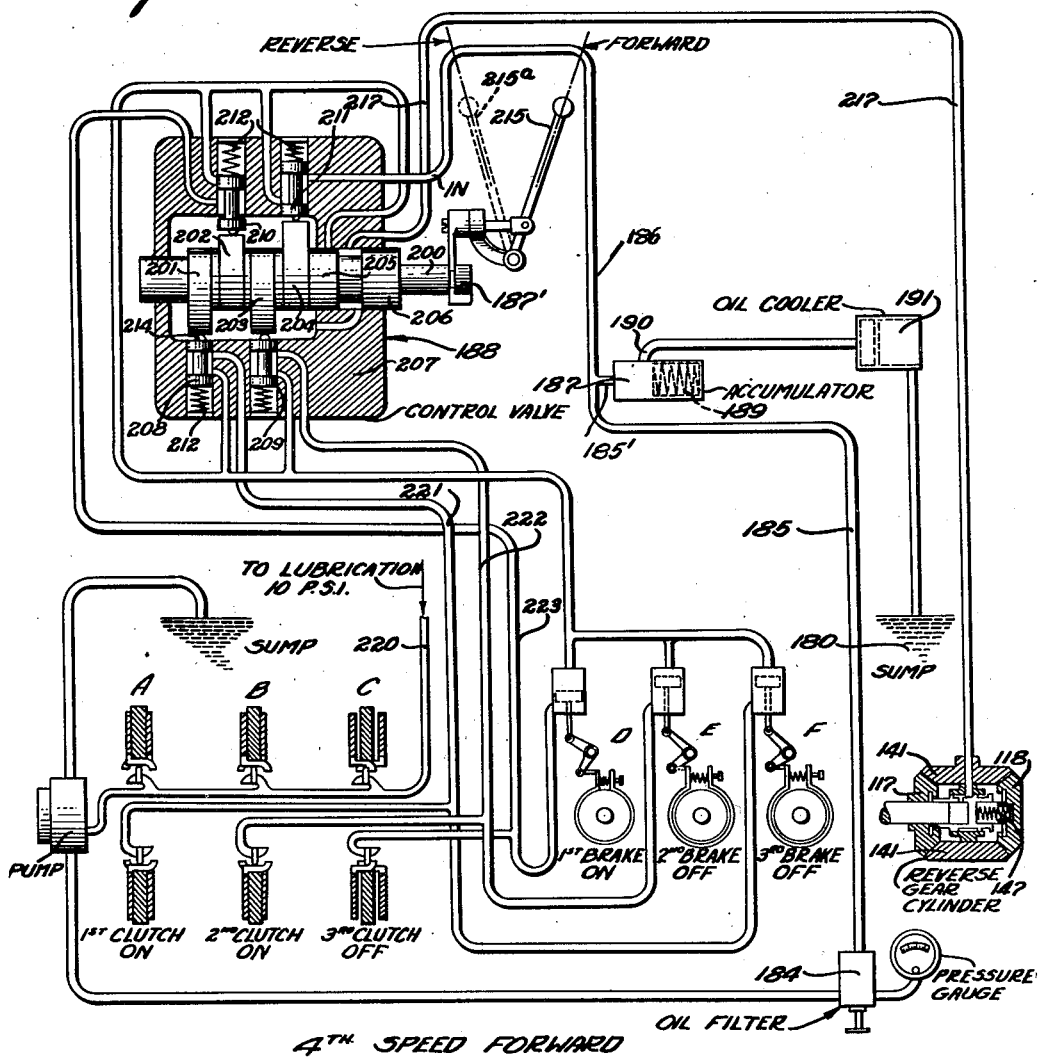

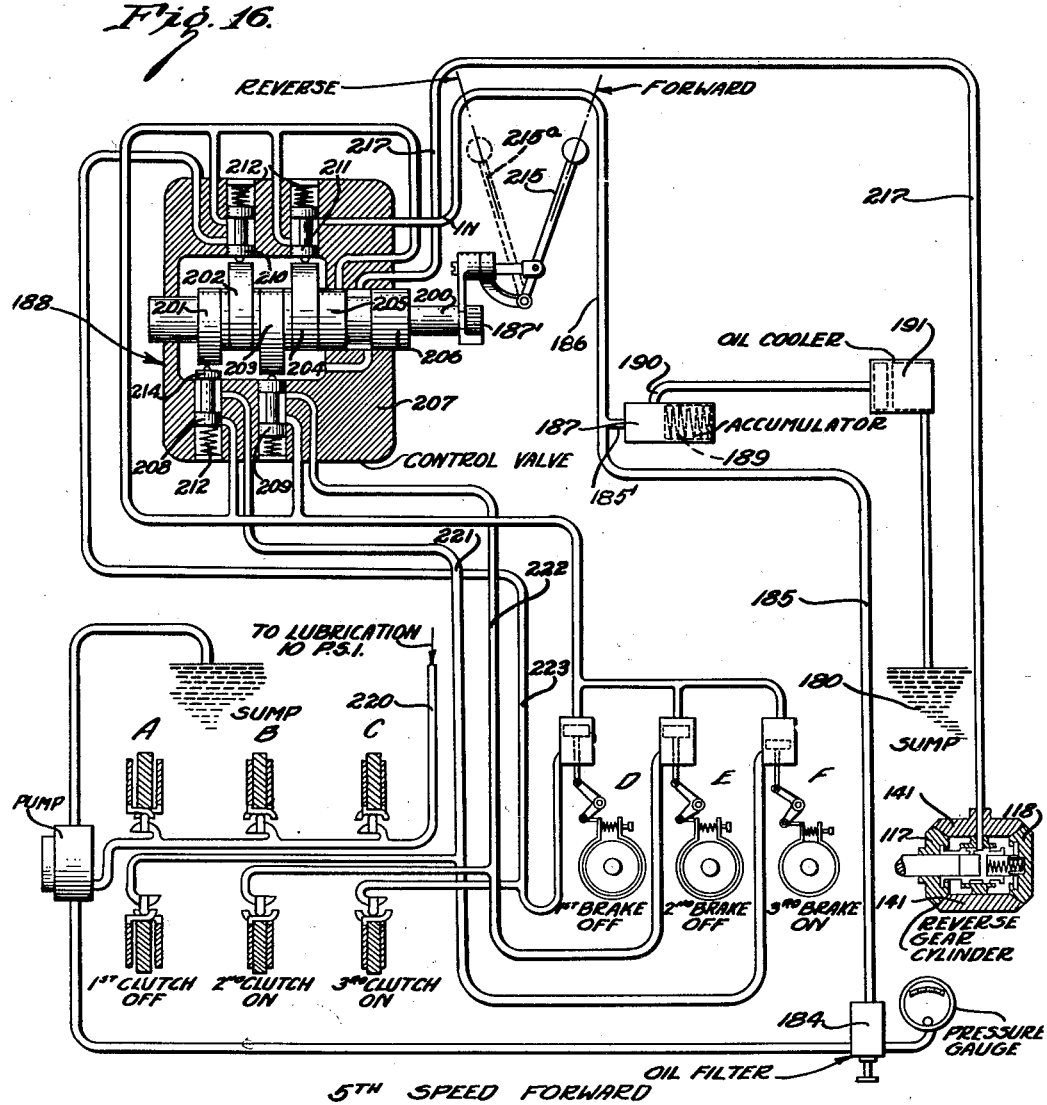

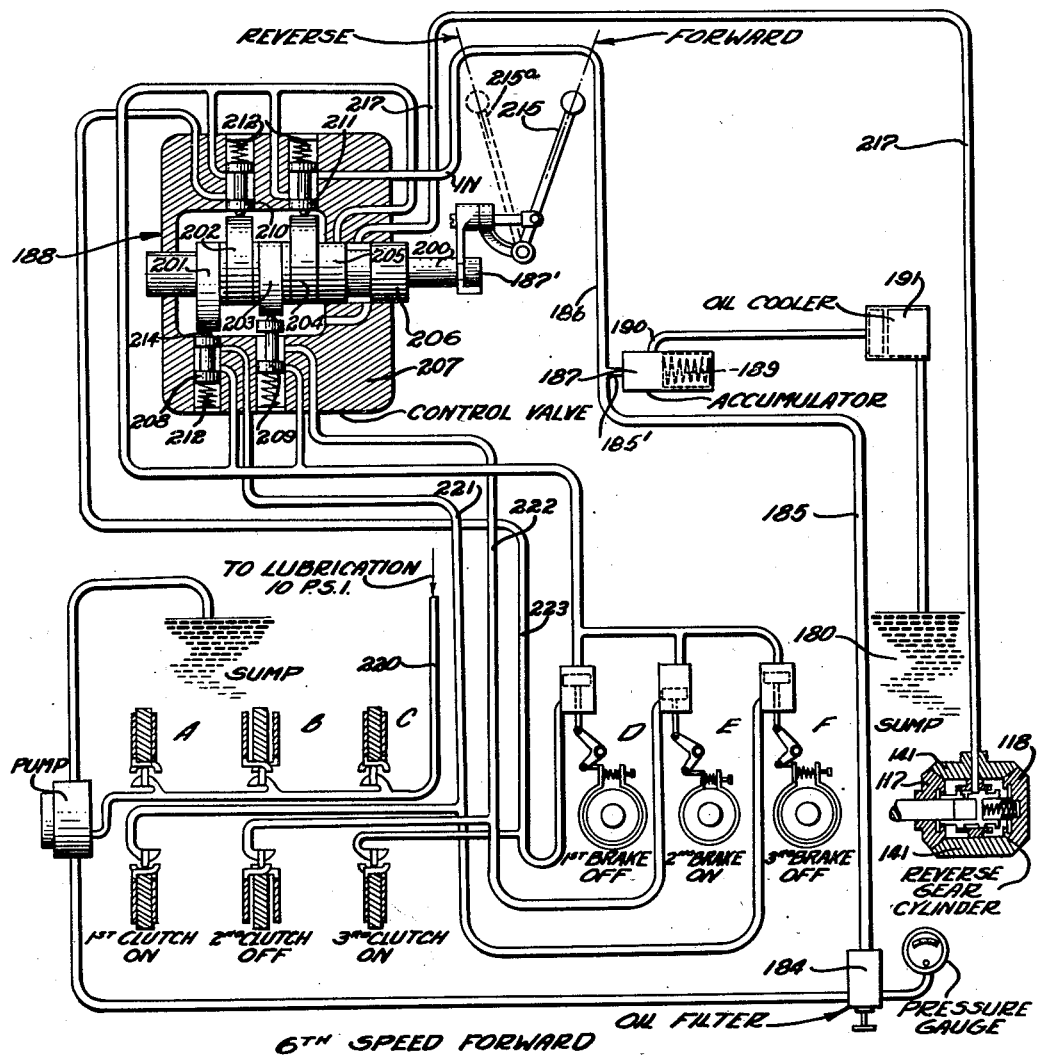

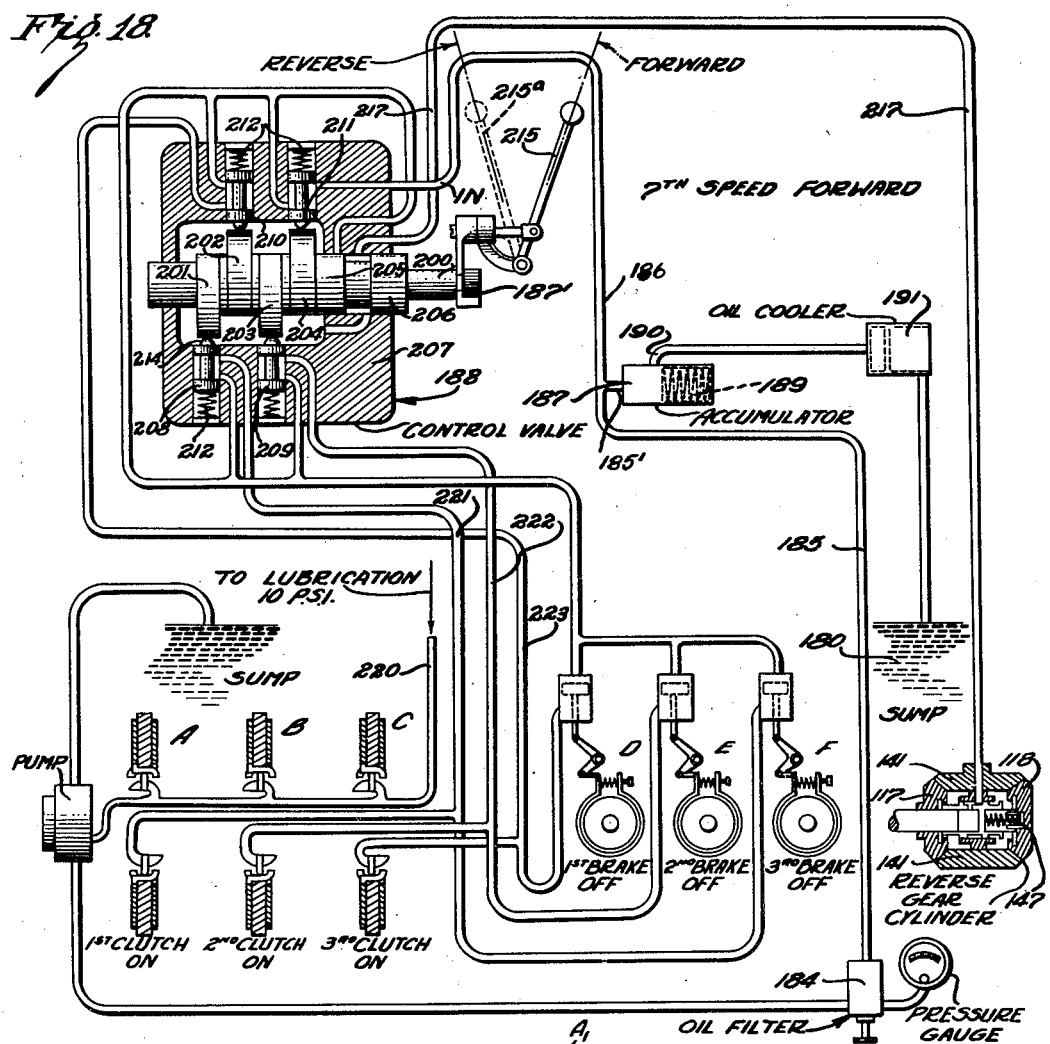

INVENTOR.
CARL E. SCHOU
BY Ralph L Barrett
ATTORNEY

Nov. 7, 1950     C. E. SCHOU     2,529,423
TRANSMISSION MECHANISM

Filed Jan. 14, 1948     18 Sheets-Sheet 18

INVENTOR.
CARL E. SCHOU

Ralph F. Bassett
ATTORNEY

Patented Nov. 7, 1950

2,529,423

UNITED STATES PATENT OFFICE 2,529,423

TRANSMISSION MECHANISM

Carl Einar Schou, Seattle, Wash., assignor to Pacific Car and Foundry Company, Renton, Wash.

Application January 14, 1948, Serial No. 2,293

21 Claims. (Cl. 74—761)

This invention relates to a multiple speed transmission of simple construction and operation and capable of increasing acceleration and improved maneuverability.

A further object of this invention is to provide a mechanism of the type in question in which the controls are of such a character that the vehicle in which the transmission is installed can be started at any selected speed or direction by a single simple motion of a control lever.

More specifically the present invention includes hydraulically controlled friction dry clutches for transferring from a drum type flywheel power to an output shaft through preselected combinations of epicyclic gear trains compounded.

A further object of the invention is to provide in an assembly of the type described, a hydraulically operated dry clutch in which the pressure acts evenly around the entire area of the clutch discs, whereby peak efficiency is obtained in operation and the possibility of hot spots eliminated.

A further object of the invention is to provide a clutch structure in which the clutch piston remains stationary relative to longitudinal motion, although rotating at the speed of its attached shaft.

A still further object is to provide a clutch assembly in which the cylinder of the hydraulic clutch mechanism is attached to and rotates with the shaft, and is capable of longitudinal movement through pressure in pressure chambers including in part a pair of steel alloy diaphragms, the clutch cylinder being attached to the clutch pressure plate for actuating the same.

Another and important feature of this invention is the provision of a pump mounted so as to be driven by the input shaft for maintaining constant pressures, and providing a fluid supply suitable for control and operation of the clutches and an additional fluid supply for establishing proper lubricating pressure, the fluid supply for operation of the clutches being the same fluid used in the lubrication of the mechanism.

Another object of the invention is to provide a hydraulic system for actuating the clutches in which centrifugal force is utilized for equalizing the pressures at both sides of the clutch piston to insure separation of the clutch elements during inoperative periods of the clutch.

Another object accomplished by this invention is the provision of balances for the torque reaction of the planetary gear trains by the use of external brakes two of which are of the double wrapped type while the third is of the balance type.

Another object of the invention is to provide means for manual operation of the clutches upon failure of the hydraulic system.

In the drawings:

Figures 1ª, 1ᵇ and 1ᶜ constitute a longitudinal sectional view through the assembly:

Figure 2 is a transverse section on line 2—2 of Figure 1ᵇ;

Figure 3 is a transverse section on line 3—3 of Figure 1ᶜ;

Figure 4 is a section on line 4—4 of Figre 1ᶜ;

Figure 5 is a partial elevation showing the end plate of the filter cartridge chamber;

Figure 6 is a sectional view taken on line 6—6 of Figures 1ᵇ and 1ᶜ;

Figure 7 is a sectional view on line 7—7 of Figure 3;

Figure 8 is a vertical sectional view on line 8—8 of Figure 1ª showing the pump structure for supplying pressure for operating the clutches and lubricating the device;

Figure 9 is a sectional view taken on line 9—9 of Figure 1ª;

Figure 10 is a diagrammatic view showing the control layout for the present transmission in neutral position;

Figure 11 is a plan view of the control lever;

Figure 12 is a diagrammatic view showing the control system in first speed forward;

Figure 13 is a diagrammatic view of the control system in second speed forward;

Figure 14 is a diagrammatic view of the hydraulic control system shown in third speed forward;

Figure 15 is a diagrammatic view showing the control layout for fourth speed forward;

Figure 16 is a diagrammatic view of the control system in fifth speed forward;

Figure 17 is a diagrammatic view showing the control system in sixth speed forward;

Figure 18 is a diagrammatic view showing the control system in seventh speed forward;

Figure 19 is a schedule of gear ratios and clutch brake functions;

Figure 1B:
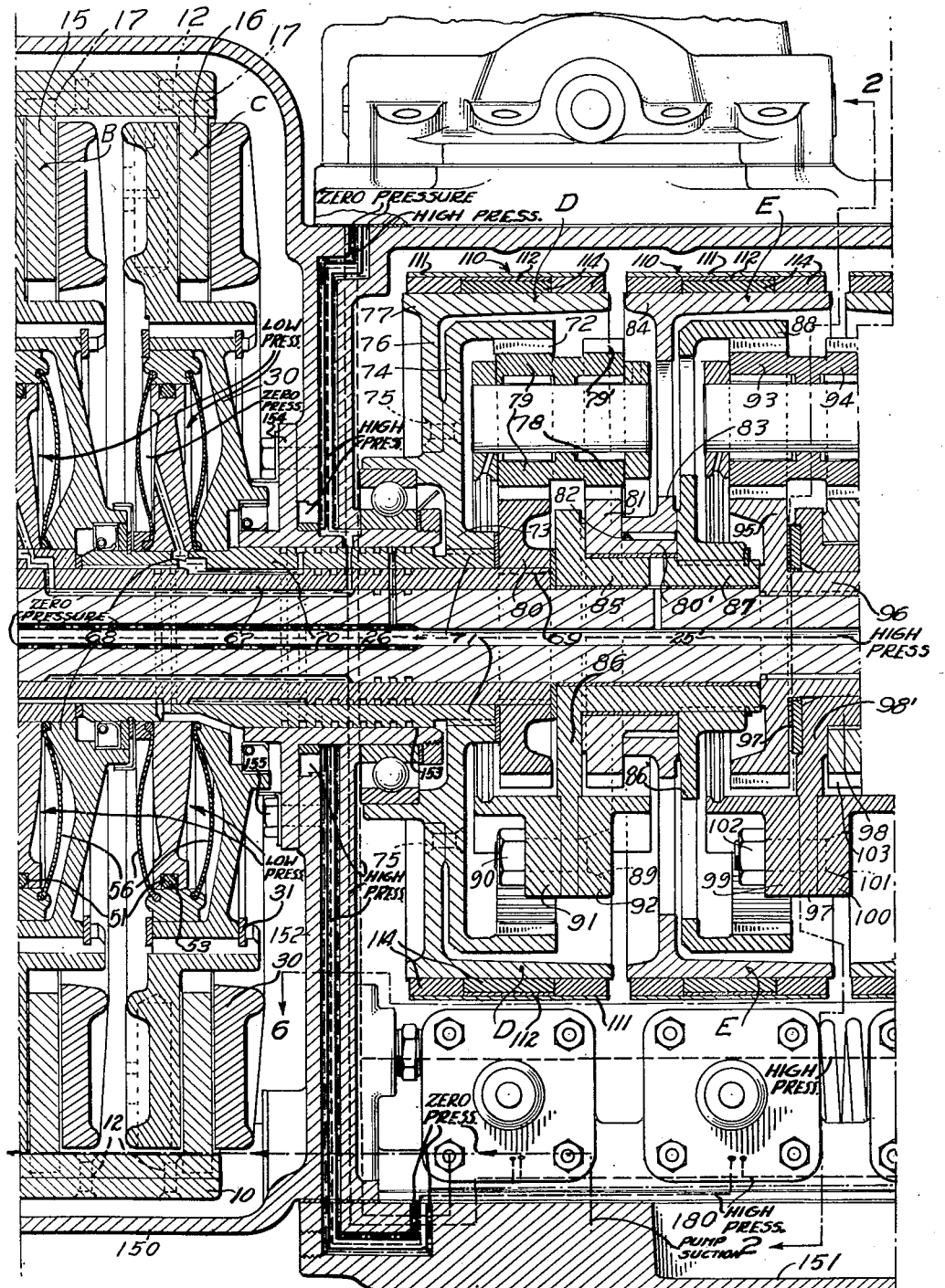

Referring now to the assembly, power is supplied to the input shaft 1 through yoke 2 which is splined to the shaft 1 as indicated at 3 and retained in position by nut 4 threaded on the reduced shaft extremity 5 and locked in position by the cotter pin 6. The shaft 1 is provided with an annular flange 7 to which is secured the drum type flywheel 8 by rivets 9. The drum cylinder 10 is provided with a plurality of keys 11 forming splines, which may be secured by rivets 12 or these keys may be formed as an integral part of the drum assembly. Suitably spaced within the drum 10 of the flywheel are three clutches A—B and C each having a friction plate 14, 15 and 16, respectively, these plates having their outer peripheral edges notched to receive the keys 11 as indicated in dotted line at 17.

The input shaft 1 has its inner end axially bored to provide a fluid chamber 18, the wall of this chamber at the inner end of the shaft being formed with an annular recess 19 defined at its inner end by the shoulder 20 and receives the bearing raceway 21 in which are arranged the cylindrical bearings 22.

Figure 23:
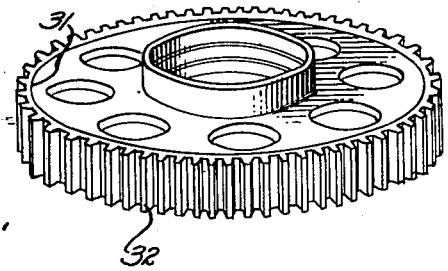
Figure 23 is a perspective view of a clutch piston.
Figure 24:
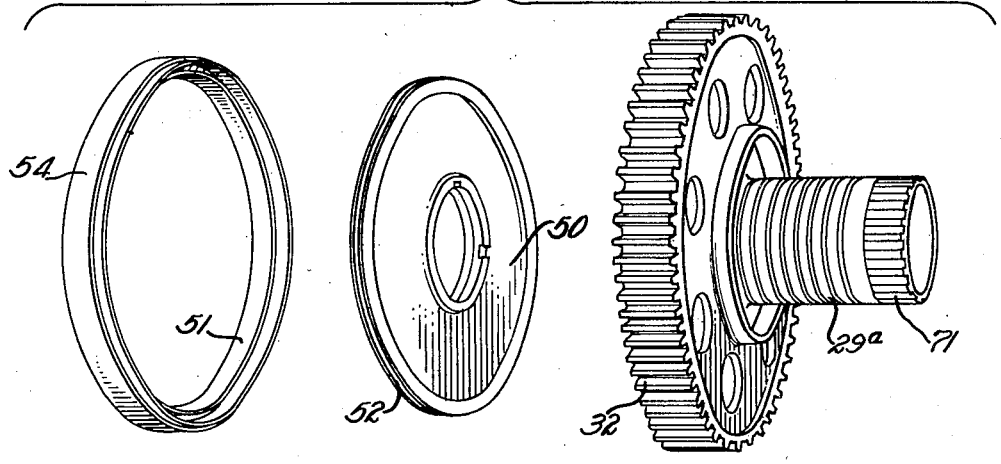
Figure 24 is an exploded view of the clutch actuating mechanism.
Figure 25:
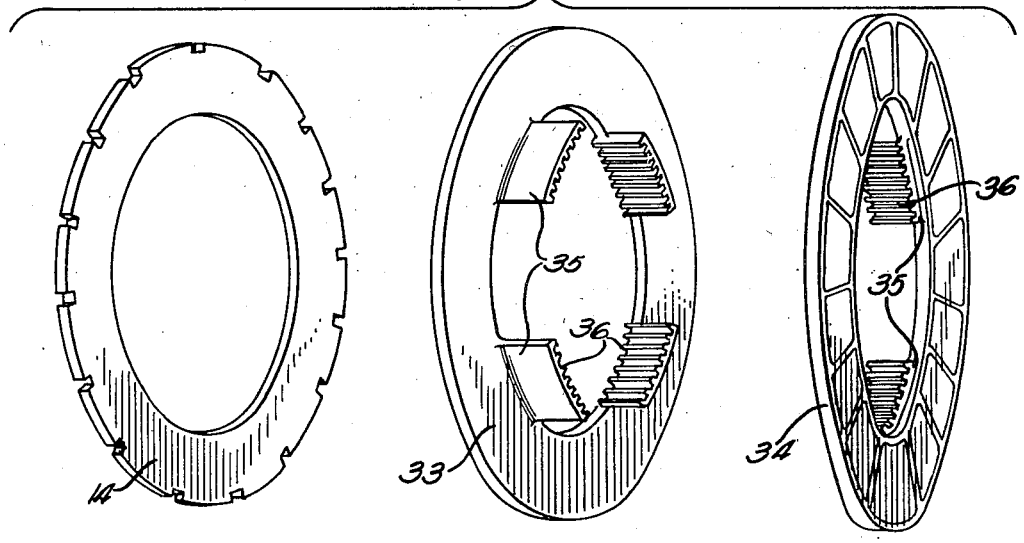
Figure 25 is an exploded view of the clutch plates associated with the structure of Figure 24.

For mounting a series of clutch structures and planetary assemblies three concentric shafts are provided. The inner of the concentric shafts indicated by reference character 24 has its reduced end portion 25 provided with an outer bearing surface for arrangement and rotation within the confines of the roller bearing assembly 22. A thrust ring 23 prevents displacement of the bearing 22 and is interposed between adjacent shoulders on the input shaft 1, and inner concentric shaft 24. The shaft 24 is formed with a central bore 26 throughout its entire length, the bore being open at the end 26ª in which there is provided a nipple 26ᵇ, and is closed at its opposite end by the plug 27. This nipple 26ᵇ forms a closure for the cylindrical chamber 26ᶜ formed by the pipe 26ᵈ concentrically arranged within the bore 26 and spaced from the wall of the bore. A multiplicity of lateral ports are provided in the shaft communicating with the central bore cylindrical chamber 26ᶜ for the purpose of permitting the circulation of the lubricant and control fluid as will be hereinafter more fully described. Also it will be noted that the axial bore 26 is of greater diameter throughout that portion defined by the end to end limits of the clutch assembly. The forward end of the shaft adjacent the reduced bearing extremity 25 is enlarged at 28 to provide for the reception of the hub 29, of the clutch member 30, this clutch member 30 including the hub 29, the offset disc portion 30', and the annular flange or ring structure 31 which is formed at its periphery face with transverse teeth 32 (see Fig. 23). The ring structure 31 overlies the hub and the toothed periphery of the structure cooperates with the disc plates 33 and 34 shown in Figure 25. The disc plates 33 and 34 are formed with large central openings and equally spaced horizontal arcuate toothed plates 35 extend about the annulus of the opening and are provided with internal teeth 36 which mesh with the teeth 32 of the ring structure 31. The arcuate plates 35 each form an equal segment of the annulus so that when the plates are assembled around the ring 31 these plates form a continuous tooth engaging structure about the periphery of annular flange 31. The arcuate plates 35 are locked by rings 37 against transverse movement with respect to the toothed ring 31. The structure of clutches A and B are substantially identical, the structure of these two clutches being comprehended by the clutch member 31 in Figure 23 and the clutch plate assembly of Figure 25. The clutch structure C is shown at Figure 24, in this clutch assembly the hub 29ª of the member 32 being substantially elongated to extend within the partition wall of the main housing. The elongated hub 29ª terminates in a spline structure 71 which forms a part of the first planetary assembly as hereinafter described. The elongated hub 29ª thus forms the third or outer concentric shaft.

In the present design the three clutches are each furnished with a balanced pressure system. Each clutch includes the stationary piston 50, sealed and enclosed between the two diaphragms 56, and an outer ring 54, which provides two chambers, each of which are connected to their separate hydraulic pressure system. One chamber is connected to the high pressure system which actuates the clutch and the other side is connected to the low pressure system. Both of the chambers are connected to the transmission lubricating system and thus as the pressure areas are identical, the specific gravity of the fluid in the two systems also are identical and any centrifugal affect upon the clutch pressure plate is eliminated regardless of the rotational speed. In the operation of the clutches the application of high pressure causes a shifting of the two concave plates together with their ring-like pistons 54, the movement of the pistons engaging the shiftable clutch plates 30 to cause the engagement of the clutch parts and the connection of the drive to the associated assembly. As previously stated, the pressure in the two cylinders at each side of the fixed members 50 is substantially balanced and the application of high pressure to the high pressure side unbalances the static condition and produces the essential actuating pressure. The ring-like member 54 which moves with the diaphragms 56 shifts in a horizontal plane or axially of the assembly, this movement being brought about by the action of the forces as well as due to the novel structure and prevents canting or unbalancing of the pressure plates.

Figure 20:
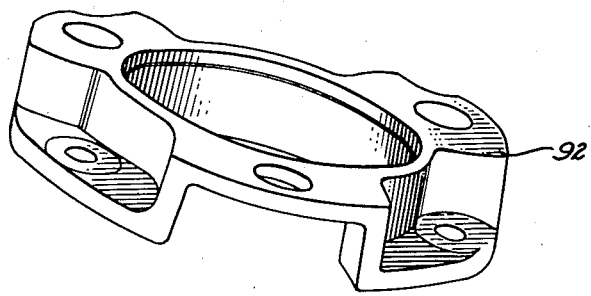
Figure 20 is a perspective view of one half of a planetary cage.
Figure 21:
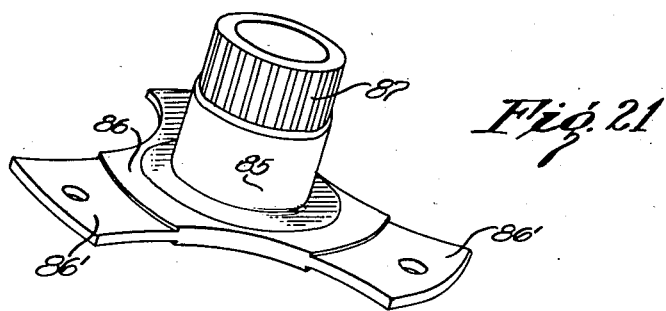
Figure 21 is a perspective view of the sun gear and its mounting.
Figure 22:
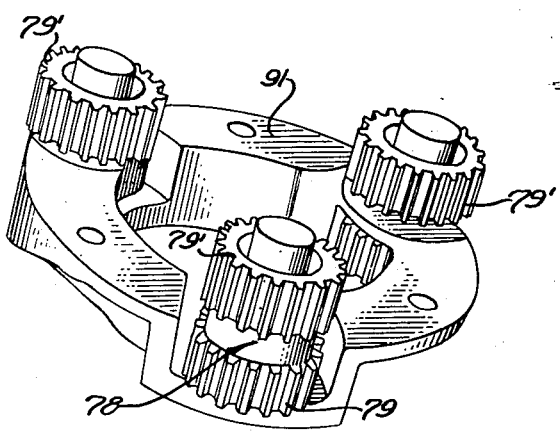
Figure 22 is a perspective view of the other half of the planetary cage with the planet elements in position.

Within the open wall chamber formed by the clutch member 30 there is arranged a piston 50, this piston being fixed on the hub 29 and in the form of a circular plate, the center portion of which is formed with an opening for seating about the hub 29 (see Figure 24). The peripheral edge portion 51 of the piston is provided with an annular channel 52 in which is arranged an O-ring 53. As stated the piston 50 is fixed against longitudinal movement but rotates with the hub 29 with the cylinder 54 the inner annular face 55 of which cooperates with the O-ring 53 to provide a liquid seal between the parts. The cylinder 54 is formed as a ring structure (see Figure 24) being connected to the hub 29 and rotating with this part but being free to slide axially of the assembly. At each side of the piston there is provided a light metal diaphragm 56 the outer peripheral edge of each of the diaphragms 56 being sealed into the annular outer faces of the longitudinally slidable cylinder 54 as at 57. The inner marginal edges 58 of the diaphragms 56 are sealed to the fixed piston 50 at its junction with the hub 29 of the friction plate 30. A seal ring 60 is used to secure the forward diaphragm in place and a snap ring 61 seats in an annular groove in the hub 29 to lock the seal ring 60 in position. Obviously the connection is associated with both connections 58 and improves their effectiveness. The inner end 65 of the enlarged portion 28 of shaft 24 is defined by an annular wall against which a thrust plate 66 is seated. Abutting this thrust plate is a second concentric shaft 67 upon which is fixed the hub 68 of the second dry clutch assembly. The inner end of shaft 67 is splined at 69 to the spur gear 80 forming the sun gear of a planetary as will be more fully described. The structure of the second dry clutch assembly B is identical in substance with the previous clutch structure A described and for this reason the parts bear similar reference characters. The hub portion 70 of the clutch plate 30 of clutch assembly C forms the third or outer concentric output shaft, this hub extending through a partition wall in the casing as hereinafter further described and having its inner end 71 splined to the hub of internal ring gear 72. The internal gear 72 includes the hub portion 73 splined to the outer concentric output shaft 71 and the connecting web 74 which latter is secured by means of rivets 75 to the web structure 76 of the brake drum 77. Within and meshing with the internal ring gear 72 are a series of dual planetary pinion structures 78 (better shown in Figures 2 and 22), the forward planetary pinion 79 meshing with the spur gear 80 splined to the inner end of the intermediate concentric shaft 67. The gear 80 forms one of the sun gears of the planetary assembly while the gear 81 forms the companion sun gear structure which meshes with planetary pinion 79'. The sun gear 81 has a hub 80' which is splined at 82 to the hub 83 of the brake drum 84, this brake drum being fixed to the internal ring gear as in the first planetary structure. A hub structure 85 including an end disc portion 86 has the hub extremity splined at 87 for the reception of the splined hub portion of the adjacent internal gear member 88. The hub structure 85 has its disc-like end terminating in flattened end plate portions 85' for clamping between the two sections of the planetary cage. The disc portion 86 of the hub 85 is bolted by means of bolts 89 secured by nuts 90 to the pinion carrier cage sections 91 and 92. The structures of these pinion carriers are shown in Figures 20 and 22.

Dual pinions 93 and 94 are provided in this assembly as in the preceding assembly with the inner pinion 93 meshing with the ring gear 88 and with the sun gear 95, the sun gear 95 including a hub portion 96 splined on the inner concentric shaft 24. A thrust assembly is shown at 97 arranged between the adjacent flange 98' of hub 98 and the sun gear 95. The inner annular face of the disc or flange 98' of the hub 98 bears against this thrust assembly. The disc or flange structure 98' is bolted between the pinion carrier frames 99 and 100 by bolts 101 and cooperating nut 102. The inner pinion element 94 of the dual pinion structure meshes with the sun gear 103, this sun gear having a hub extension 104 flanged at 105, with this flange riveted by rivets 106 to the web structure 107 of the brake drum 108.

It will be noted from the foregoing that the structure now embodies an inner shaft 24 with clutch means associated for cooperation with the friction plate 14 of the hollow flywheel 10, the second concentric shaft 67 associated through clutch parts with friction plate 15 carried by the drum 10 and outer concentric shaft 71 associated through clutch parts with the friction plate 16 of the flywheel assembly 10. The inner shaft 24 has fixed thereto the hub of sun gear 95 of the intermediate brake assembly while the intermediate concentric shaft 67 has fixed thereto the sun gear 80 of the planetary assembly of the first brake assembly. For the purpose of convenience these brake assemblies have been indicated as D, E and F, and the clutch assemblies have been indicated as A, B and C.

The several brake drums 77, 84 and 108 are associated with brake bands 110, these brake band structures being shown in elevation in Figure 4 and each including an outer brake band 111 and inner brake band 112, both of which are lined in the usual manner by suitable brake material 114.

The pinion carrier assembly 99—100 has its hub 98 of the intermediate plate elongated and splined at its outer end 115 to receive the collar or hub 116 of beveled gear structure 117 which latter is a part of the reverse gear assembly. This reverse gear includes in addition to beveled gear 117 which faces towards the outer end of the structure, the beveled gear 118 which faces inward toward gear 117 and is spaced therefrom and mounted on roller bearings 119 carried by the bearing collar 120. The bearing collar or inner race 120 is mounted on the output shaft 121 having a thrust plate or shim 122 arranged between its outer flanged end and the adjacent end of the output gear 123. The output gear 123 is formed with a machined portion 124 for supporting the inner race 125 of the bearing assembly 126. The outer race 127 of this assembly is confined between end plate 128 of the casing structure to be hereinafter described. The inner beveled gear 117 is machined at 129 to receive the inner race 130 of the ball assembly 131, the outer race 132 of which is retained by the collar portion 133 of the pinion carrier 134.

The pinion carrier 134 is more clearly shown in transverse section in Figure 4 and comprises a casing body of general cylindrical form having the inner wall portion 133 and the outer wall 135 the latter to be flanged as at 135' and bolted to the end plate 128 heretofore mentioned. At diametrically opposite points there is formed in the carrier structure 134 opposite pairs of radial openings 136 each of which is adapted to receive the outer race 137 of the ball bearing 138, the inner race 139 of which is retained about the hub 140 of one of the four beveled pinions 141. The pinions 141 are associated with and mesh with the beveled gears 117 and 118 to form a reversing gear structure.

The reversing gear structure essentially includes a clutch mechanism the operation of which reverses the direction of rotation of the output shaft 121, it being apparent in the reversing gear structure of the present type that the gears 117 and 118, due to the association of the several pinions 141 are normally driven in reverse direction. The clutch gear 142 having teeth 143 at each end is adapted upon axial movement to alternately engage the teeth 117' and 118' on the beveled gears 117 and 118 respectively. The output shaft is provided with an elongated transverse slot 143 through which extends a hollow pin 144 having the oil duct 145' therein. The pin 144 extends through the hollow portion of the piston 145 and is provided medially and within the piston with a port 146 through which fluid from the ducts 145' can be introduced under pressure within and behind the piston to urge the latter axially within the bore of the output shaft 121, and against the tension of spring 147 to shift the clutch gear 142 to its reverse position into engagement with the teeth 118' of reverse gear 118. The spring 147 opposes the movement of the piston 145 in the bore of the output shaft 121, the bore of the shaft being reduced towards its outer end to receive the spring 147. The clutch gear 142 is provided with packing rings 148 while the operating piston 145 is provided with packing rings 149 to prevent leakage of the actuating fluid which is under substantial pressure.

The entire assembly is enclosed in a housing comprising cylindrical sections 150 and 151 the housing section 150 includes a rear wall 152 forming an intermediate partition, removable front wall 153, and shaft closure section 154. The rear housing 151 has the end wall section 155 and end plate structure 128 heretofore mentioned.

The housing is formed with a plurality of ducts which are connected with ports and ducts associated with the distribution of the controlling and lubricating fluid. These ducts will be hereinafter described.

For supplying necessary high pressure for operating the clutches and the reverse mechanism, and for supplying low pressure for lubricating the assembly and balance of the clutch operating mechanism, a novel pump assembly has been included at the input end of the shaft and within that section of the input housing indicated by reference character 154. The structure of the pump is shown in Figure 8 and includes a housing 156 formed by reducing the inner face of casing 154 having intake connection 157 and discharge port 158. These ports are located at the bottom of the pump structure and radiate from spaced points between which is the partition 159 secured against movement by the set screw 160. Intake chamber 161 is formed in the housing at the end of the intake pipe 157 and discharge chamber 162 is formed in the housing adjacent the discharge outlet 158. These chambers are partly defined by the partition 159 heretofore mentioned. Diametrically opposite from the partition 159 is a further partition 163 the ends of which are beveled at 164 to assist in the flow of the fluid and movement of the rollers. The rotor 165 is keyed by means of key 166 to the input shaft 1. The rotor is formed with a plurality of recesses 167 in which reciprocate a plurality of rollers 168, these rollers being carried in end plates having elongated recesses 169 so that as the rotor rotates the rollers will be cammed by cam wall 170 radially into their respective recesses to displace the accumulation of lubricant or other liquid utilized in producing the hydraulic pressure. It will be seen that the partitions 159 and 163 operate as gates to cooperate with the rollers to effect a sealing of the fluid between the intake and discharge side of the pump. A tube 171 extends through aligned openings in the shaft 1, this tube being provided with ported end walls for seating ball valves, normally urged closed by spring 172. The axial outlet 175 medially of the tube 171 provides a low pressure outlet from the pump.

The oil sump is indicated at 180 and from this oil sump the pump draws the oil into the intake chamber of the pump. The rotation of the rotor 165 of the pump assembly by cooperation with the roller pistons 168 creates a pressure in chamber at 162 but by-passes a certain portion of the fluid through port 181 for primary use in the lubrication of the assembly. This low pressure discharge through duct 181 past the ball 183 against the pressure of the spring 172 constitutes the low pressure side of the pump. The high pressure fluid is forced through the outlet 158. The high pressure stream of oil escaping through the discharge outlet 158 of the pump goes through a filtering mechanism 184 and after passing through the filter discharges into line 185. The oil line 185 leads to the inlet 185' of the spring loaded accumulator 187. The pipe 186 connects the accumulator with the sleeve valve 200 in the control valve 207. The accumulator spring 189 in the accumulator is adjusted to uncover the by-pass ports when the pressure exceeds 175 p. s. i. The by-passed oil which discharges through the by-pass ports 190 is carried to the oil cooler 191 and after passing through the cooler 191 is returned to the sump 180.

The control mechanism for controlling the hydraulic pressure and through the hydraulic pressure the operation of the clutches and brakes to provide the selective speeds desired is shown together with the system of control in the diagrammatic disclosures of Figures 10 to 18, inclusive.

Referring to these Figures 10 to 18 I have provided a rotary axially reciprocating shaft 200, this shaft being provided with prearranged cams 201, 202, 203 and 204 which rotate with the shaft. In addition this shaft is provided with sleeve-like structures 205 and 206 which operate to regulate the flow of fluid in reversing the mechanism as hereinafter described. The control shaft 200 extends through a housing 207 in which are arranged a series of reciprocating valves 208—209—210 and 211 each of these valves being opposed and normally positioned by springs 212 so that their bearing extremities 214 normally engage the cams 201—204, inclusive, to be positioned in accordance with the movement of the shaft and thus the positioning of the cams. The disclosure of Figure 10 indicates a neutral position.

For operating the mechanism to obtain various speeds the following schedule of gear ratios and clutch-brake functions is noted below:

| Speed | Ratio | #1 Clutch | #2 Clutch | #3 Clutch | #1 Brake | #2 Brake | #3 Brake |
|---|---|---|---|---|---|---|---|
| Neutral |  | Off | Off | Off | Off | Off | Off |
| 1st | 4.50-1 | Off | On | Off | On | Off | On |
| 2nd | 3.00-1 | On | Off | Off | On | On | Off |
| 3rd | 2.25-1 | Off | Off | On | On | On | On |
| 4th | 1.80-1 | On | On | Off | On | Off | Off |
| 5th | 1.50-1 | Off | On | On | Off | Off | On |
| 6th | 1.286-1 | On | Off | On | Off | On | Off |
| 7th | 1-1 | On | On | On | Off | Off | Off |

Ratios—Clutch-Gear functions are same forward and reverse.

The valve shaft 200 upon which the cams 201, 202, 203 and 204 are formed or mounted for actuation of valves 208–211, inclusive, is adapted to be shifted axially by movement of the control lever 215 to the dotted line position 215a. The movement of the valve shaft 200 on its longitudinal axis will open or close the passageway controlling the conduit 217 to admit fluid to the reversing mechanism best shown in Figure 1c whereby the piston 145 is moved against the tension of spring 147 within the cylinder formed in the output shaft, whereby the reversing clutch member 142 is caused to engage or disengage the gears 117 or 118 to determine the direction of rotation of the output shaft.

Referring particularly to the diagrammatic views from Figures 10 to 18 inclusive, it will be noted that the present assembly includes a lubricating line 220 which normally supplies lubricant to the bearings of the assembly and which further discharges low pressure fluid into the various clutches to provide a low pressure side for these clutches, this lubricant being normally at 10 p. s. i. Additional high pressure lines are provided at 221, 222 and 223 for supplying operating pressure of approximately 175 p. s. i. to the clutches and the brakes as determined by the position of the control arm 215 for securing a predetermined gear ratio for obtaining desired speed. In Figure 11 the control lever 215 is shown with the positions of the lever indicated at neutral and adapted to be shifted as indicated for any speed forward from one to seven, inclusive. The same reverse speed is obtained by shifting the valve shaft 200 axially by movement of the control lever 215 to dotted line 215a as shown in Figure 10.

In Figures 2, 3, 4 and 6 the structure of the brake control motors is illustrated, these brake controls being for the purpose of actuating the brakes about the brake drums 77, 84 and 108, which brake drums carry with them the ring gears 72 and 88 of the first and second planetary assemblies and sun gear 103 of the third planetary assembly. There are three fluid motors for actuating the three brakes of the planetary assemblies, these motors being indicated at G, H and I in Figure 6. Each motor, referring to Figure 3, includes a cylinder having a liner 220 in which is arranged a piston 221 through which extends a central shaft 222, the inner portion of which operates as a guide and the outer end portion 223 of which abuts against the operating lever 224 more clearly illustrated at Figure 7. All of the operating levers for the fluid motors are mounted on a shaft 225 supported by a bracket structure 226. Each of the operating levers 224 is provided with an offset shoulder 227 formed with a recess more clearly shown in Figure 3 in which the end of the operating rod 228 seats. The upper end of the operating rods 228 are pivoted on pins 229 in one end of the brake band structure. The opposite end of the brake band structure is supported and adjusted by the threaded bolts 230 which extend through an adjacent portion of the casing wall and are locked in adjusted position by the lock nuts 231. A spring 232 is interposed between the adjacent ends of the brakes to normally retain them in expanded position free from engagement with the brake drums.

In Figure 6 the structure of the accumulator is shown, this accumulator including the cylinder 234 in which there is arranged a piston 235 normally urged within the cylinder by the spring 236 seating in plate 237 which can be adjusted by bolts, such as bolt 238, to vary the load on the spring. The arrangement of the accumulator in the control system is best illustrated by the diagrammatic drawings forming a part of this application.

In Figures 4 and 5 the general structure of the filter is shown, this filter being arranged in a chamber 240 and being of general cylindrical form as shown at 241 and adapted to receive a suitable filter cartridge. To facilitate the removal of the cartridge an end plate 242 is provided as shown at Figure 5, this plate being secured by bolts 243 and having a medial opening for the extension 244, which latter is provided with the cross-arm 245 to facilitate manipulation. The oil enters the filter chamber through high pressure inlet 246, passes through the filtering cylinder and into the outlet 247 as clearly shown by Figure 4.

The present disclosure indicates wherever possible the movement of the fluid, either at high pressure, as for instance for operating the clutches and brakes and reversing mechanism, or at low pressure which is approximately 10 p. s. i., which low pressure is available to assist the functioning of the brakes and clutches and to supply necessary lubricant to the bearing surfaces, and zero pressure where the fluid is open to the atmosphere. In this connection attention is called to Figures 1b and 6 in which the medial partition 152 is shown as including three spaced passageways 250, 251 and 252, these spaced passageways extending through the vertical partition 152 for conducting fluid at the different pressures to the various working parts and particularly to the clutches and brakes. The connecting passageways to the brake control motors is best illustrated in dotted line in Figure 6, while the flow of high pressure fluid to the clutches is shown best in Figure 1b. It will be noticed by reference to Figure 1b that the main supporting structure is arranged at this medial partition 152, the structure including the collar 153 which is relatively wide in width and flanged at 154 for connection by bolts 155 with the partition. It is within the limits of this supporting structure that the fluid passageways are provided for delivering fluid in the direction of the clutches and also for lubricating the various parts. It will be noted that the passages for operating the various clutches extend between the concentrically arranged shafts.

Generally in the present development the pump at the input shaft takes a suction from the sump located in the bottom of the cover plate 151, the oil from the sump entering the pump on the suction side and being discharged from the pump at two pressures, the high pressure discharging through outlet 158 is maintained at substantially 175 p. s. i., and by means of the ball check reducer 183 the low pressure discharge is provided, this pressure being approximately 10 p. s. i. As will be evident from the disclosure the high pressure stream is piped to the inlet 240 of filter 184 (see Figure 4) and from the filter the high pressure oil branches into two lines, one line leading to the inlet port 234 of the spring accumulator (see Figure 6) and the other line leads to the sleeve marked "in" in the control valve 188 (see diagrammatic views Figures 10 to 19). The accumulator spring 236 is adjusted to uncover the by-pass port when the pressure exceeds 175 p. s. i. and the excess oil from the accumulator is throttled through by-pass ports to the oil cooler and after passing through the cooler is returned to the sump 151.

In connection with the first forward speed operation, the first speed reverse, and shifting from first speed forward to second speed reverse the operation will be as follows: the control lever 215 is moved so that the cam 204 shifts the valve 211 to admit high pressure oil and distribute it to the valve indicated by reference character 208, valve 209, valve 210, reverse control spool valve 205—206 and to the uncontrolled sides of all brake cylinders. In this position of the control lever 215 the valve 208 closes a high pressure inlet port and connects the control port for clutch A and brake 3, discharging to the sump. No pressure on the high pressure side disengages clutch A and no pressure on the negative side allows brake F to set. The valve marked 209 connects the high pressure to control port for clutch B and brake E. This causes clutch B to engage and high pressure on the negative side releases brake E. The valve marked 210 covers the high pressure inlet port and connects control port for clutch C and brake D and discharges to the sump. Hence from the foregoing description the valve 208 disengages clutch C and sets brake F. As previously described the operating fluid from the control valve connects with the three passages 250, 251 and 252 in the medial partition or central web of the main housing, and at the shaft these passages 250, 251 and 252 are split with part of the fluid stream going directly to the control side of the appropriate brake cylinder and part of the liquid stream going through the distributor ring and multiple shaft passages to the high pressure side of the appropriate clutches A, B and C. Thus the control for clutch A and brake F, clutch B and brake E, and clutch C and brake D is arranged to be in parallel. With the shift lever in forward position the reverse control spool valve 205—206 covers the high pressure center port and connects the reverse gear cylinder control port to the sump. The positive side of all brake cylinders are directly connected to the outlet port of the valve marked "in" (211). This pressure acting on the small positive side of the differential brake pistons in the brake motors instantly sets the brakes except when nearly equal pressure acts on the large opposite or negative side of the pistons. For purposes of explanation the positive side of the brake pistons refers to setting the brakes and the negative side of the brake pistons refers to the side utilized in releasing the brakes. Normally the springs keep the brakes released when both sides of the brake cylinders are connected to the sump, as when the shift lever is in neutral. The 10 p. s. i. stream originating from the ball check 183 of the pump is always connected to the low pressure (releasing) side of all clutches. This low pressure also provides force feed lubrication where and when necessary. Summarizing the action above it will be seen that as a result of the movement of the control lever clutches A and C are off or disengaged and clutch B is on or engaged while at the same time brakes D and F are on or set and brake E is off or released.

In connection with reversing the above operation all of the previously described flows remain the same except the reverse control spool valve. Moving the shift lever from forward to reverse position shifts the reverse control spool valve covering the port to the sump and connecting high pressure to the control port. The spring in the reversing assembly holds the double jawed clutch in the forward position when the reverse gear cylinder is connected to the sump. The application of high pressure on the reverse gear cylinder causes the double jawed clutch assembly to move longitudinally to the rear or towards the outer end of the output shaft against the spring tension, disengaging the forward jaw of the clutch and engaging the reverse jaw.

The changes in operation from the first speed ahead to the second speed ahead are as follows: the valve 211 and valve 210 together with reverse control spool valve does not change from the positions described for first speed forward. The valve 208 uncovers the high pressure inlet port, covering the drain to the sump, and connects the high pressure to the control port for clutch A and brake F. This engages clutch A and releases brake F. The valve 209 covers the high pressure inlet port and connects the control port to the sump. This disengages clutch B and sets brake E. Thus clutches B and C are off or disengaged and clutch A is engaged while brakes D and E are on or set and brake F is off or released.

What I claim as new and useful and desire to obtain by Letters Patent is:

1. In a power transmitting assembly, an input shaft, a pump driven by said input shaft, a series of concentric shafts each driven through a fluid actuated pre-selective clutch from said input shaft, a plurality of planetary assemblies axially aligned with respect to the input shaft, said planetary assemblies each including a spur gear, at least one sun gear, a planet unit, a ring gear and a brake, said planet units including in part duplex pinion structures and said duplex pinions being adapted to mesh with the sun gear and ring gear of its own planetary assembly and with said spur gear, which is fastened to said brake, one element of each planetary assembly being directly driven by one of said concentric shafts, means for actuating said braking means simultaneously with the operation of a pre-selected clutch for varying the gear ratio to the output shaft, a reversing gear unit interposed between said output shaft and said concentric shafts, and means for actuating said reversing gear unit simultaneously with the operation of a predetermined clutch and planetary assembly, by fluid pressure from said pump.

2. In a transmission mechanism, an input shaft, a pump driven by the input shaft and having high and low pressure discharge outlets, a plurality of concentric shafts, fluid actuated clutch means connecting the concentric shafts with said input shaft, said clutch means including friction clutch plates, and a movable fluid piston for moving said clutch plates into and out of engagement, said fluid piston being actuated in opposite directions by fluid pressure from a pair of spaced fluid chambers, said chambers being in communication with the high and low discharge outlets from said pump, an output shaft, planetary assemblies for varying the speed ratio between the input and output shafts and having driving association with said concentric shafts, a reversing gear unit for reversing the drive from the planetary assemblies to said output shaft, means for operating said clutches by fluid pressure supplied from the outlets of said pump, and means operated by fluid pressure for operating said reversing gear unit.

3. In a transmission mechanism, an input shaft, a pump driven by the input shaft and having high and low pressure discharge outlets, a plurality of concentric shafts, clutch means connecting the concentric shafts with said input shaft, an output shaft, planetary assemblies for varying the speed ratio between the input and output shafts and having driving association with said concentric shafts, a reversing gear unit for reversing the drive from the planetary assemblies to said output shaft, means for operating said clutches by fluid pressure from said pump, fluid pressure means opposing the operation of said clutches, means operated by fluid pressure for actuating said reversing gear unit, and means for braking one of the elements of at least one of said planetary assemblies upon operation of pre-selected clutches.

4. The substance of claim 2 characterized in that the discharge from the low pressure side of said pump provides the low pressure fluid for opposing operation of said clutches by fluid from the high pressure side of said pump.

5. The substance of claim 2 characterized in that the fluid from the low pressure discharge of said pump is urged under pressure through sages to provide lubricant for the bearings of the assembly.

6. In a transmission mechanism, a casing including a vertical medial partition, said partition being provided with a plurality of fluid passageways, an input shaft, a pump driven by the input shaft and having high and low pressure discharge outlets, a plurality of concentric shafts, clutch means connecting each concentric shaft with said input shaft, said clutch means being arranged at one side of said medial partition, an output shaft, a planetary assembly arranged on each of said concentric shafts at the opposite side of said partition for varying the speed ratio between the input and output shafts, fluid means for operating said clutches, brake means for said planetary assemblies, fluid actuated means for operating said brake means, valve control mechanism carried by the casing for regulating the flow of fluid through the passageways in said medial partition, means for delivering fluid from said pump to said valve control mechanism, passageways extending through the concentric shafts and connecting the passageways in said medial partition with said clutches, fluid connections between said medial passageways and said brake actuating means, a reversing gear unit for the assembly, said reversing gear unit being arranged at the output end of the assembly and including a clutch, a fluid actuated piston for operating said clutch, spring means opposing said piston, and means for supplying fluid to said piston from said pump.

7. The substance of claim 6 characterized in that the output shaft is formed with an axially extended cylindrical bore in which the piston for operating the reversing gear clutch is located.

8. The substance of claim 6 characterized in that the output shaft is provided with an axial cylindrical bore having a reduced portion, the bore being adapted to receive said fluid piston and the reduced portion of said bore receiving a spring opposing the piston movement in one direction.

9. In a transmission mechanism, a casing including a vertical medial partition, said partition being provided with a plurality of fluid passageways, an input shaft, a pump driven by the input shaft and having high and low pressure discharge outlets, a plurality of concentric shafts, clutch means connecting each concentric shaft with said input shaft, said clutch means being arranged at one side of said medial partition, an output shaft, planetary assemblies arranged at the opposite side of said partition for varying the speed ratio between the input and output shafts and having driving association with said concentric shafts, fluid actuated means for operating said clutches, brake means for said planetary assemblies, fluid actuated means for operating said brake means, valve control mechanism carried by the casing for regulating the flow of fluid through the passageways in said medial partition, means for delivering fluid from said pump to said valve control mechanism, passageways extending through the concentric shafts and connecting the passageways in said medial partition with the fluid actuated means for operating said clutches, fluid connections between said medial passageways and said brake actuating mechnism, a reversing gear unit for the assembly, said reversing gear unit including a pair of oppositely arranged bevel gears and intermediate pinions, said pinions being concentrically arranged about said output shaft, clutch means for alternately engaging said bevel gears with said output shaft, a fluid actuated piston arranged in a bore formed in the output shaft, a pin connecting said clutch means with said piston and a passageway extending through said pin and piston and discharging into said bore at one end of the piston for shifting the latter axially of the output shaft.

10. The substance of claim 9 characterized in that the clutch means and planetary assemblies are selectively operable independent of the actuation of the reverse gearing.

11. In a transmission mechanism, an input shaft, a fluid pump delivering both high pressure and low pressure fluid mounted on said input shaft, a plurality of concentric shafts, a reversing gear unit arranged at the output end of said concentric shafts, an output shaft driven from said concentric shafts through said reversing gear unit, spaced clutch elements driven by the input shaft, each of said clutch elements transmitting power from said input shaft to one of said concentric shafts, planetary assemblies arranged on each of said concentric shafts, each planetary assembly including a sun gear, a ring gear, a planet unit and a brake for one element of each assembly, one element of each planet unit being driven by a concentric shaft and having one of its elements controlled by the brake, said planetary assemblies connecting the input shaft with the output shaft, fluid actuated means including pistons for selectively operating said clutches, opposite sides of said fluid actuated pistons being connected with the high and low pressure sides of said fluid pump, fluid pistons for actuating said brake elements, said pistons being connected at their opposite sides with the high and low pressure sides of said pump, a fluid actuated piston for operating said reversing gear unit, a connection for supplying high pressure fluid from said fluid pump to said piston, and means for lubricating the associated parts of said transmission.

12. The substance of claim 11 characterized in that the fluid pressure means for selectively operating said clutches comprises a fixed clutch piston and a movable cylinder, the cylinder being connected with alloy diaphragms forming fluid chambers and with the movable plates of said clutch elements.

13. The substance of claim 11 characterized in that the fluid actuated means for selectively operating the clutches comprises a fixed piston rotatable with a concentric shaft and a cylinder slidable about said piston and connected with said shaft by flexible diaphragms, whereby balance of pressure at each side of the cylinder for neutralizing the engagement between the clutch parts is effected by centrifugal force.

14. The substance of claim 11 characterized in that means are provided for counterbalancing the torque relation of the planetary gear train, including external brake elements applied to the ring gears of the planetaries.

15. In a transmission mechanism, an input shaft, a fluid pump delivering both high pressure and low pressure fluid mounted on said input shaft, a plurality of concentric shafts, a reversing gear unit arranged at the output end of said concentric shafts, spaced clutch elements driven by the input shaft, cooperating clutch elements for selectively driving said concentric shafts by cooperative association with said spaced clutch elements, an output shaft, planetary assemblies connecting each concentric shaft with the output shaft, fluid actuated motors, each including a stationary piston and a movable cylinder for selectively operating each of said clutches, each concentric shaft being operably connected to a clutch by means of one of said fluid actuated motors, said fluid actuated motors being operated by the application of both high and low pressure at opposite sides of the pistons and cylinders, means connecting the low pressure side of each of said fluid actuated motors with the lubricating system, brake means for retarding pre-selected elements of each of said planetary assemblies and means operated by high pressure fluid from said fluid pump for operating said reversing gear regardless of the operative association of the clutches and planetary assemblies.

16. The substance of claim 15 characterized in that the movable cylinder of each clutch element is connected to its concentric shaft by spaced diaphragms which form chambers at opposite sides of the stationary piston.

17. The substance of claim 15 characterized in that the movable cylinder of each fluid actuated means is connected to its concentric shaft by a pair of spaced diaphragms, between which is located the stationary piston whereby identical pressure areas at each side of the piston are established.

18. The substance of claim 15 characterized in that the brake means for retarding pre-selected elements of the planetary include double wrapped brake bands which counter balances torque reaction upon the planetary gear trains.

19. The substance of claim 15 characterized in that each clutch assembly includes a hollow hub having an offset wall in which is arranged a fluid motor, the hub being provided with peripheral teeth about which are arranged the outer plates of the clutch structure, the outer plates being provided with arcuate internally toothed projections which alternately seat about the toothed hub.

20. In a clutch assembly, a drive member, a driven member, an annular clutch plate fixed on said drive member, an annular clutch element shiftable to engage the rotating clutch element carried by said driven member, said annular shiftable clutch element being formed with an inwardly facing annular wall portion, a fluid motor for shifting the last named clutch plate into engagement with the clutch plate on the drive member, said fluid motor including a fluid chamber formed of a pair of concave annular resilient plates, a fixed backing plate arranged medially of the resilient plates and forming with said resilient plates a pair of laterally spaced fluid chambers having substantially uniform pressure areas, means at the outer periphery of the backing plate forming a sliding seal with said annular wall portion, a source of low pressure fluid, means for normally supplying said low pressure fluid to one of said chambers, a source of high pressure fluid, and means for selectively introducing high pressure fluids to the other chamber to shift said resilient plates to cause said shiftable clutch element to engage the clutch element on said drive member.

21. In a transmission mechanism, an input shaft, a fluid pump delivering both high pressure and low pressure fluid driven from the input shaft, a plurality of concentric shafts, a planetary assembly connecting each concentric shaft with the output shaft, each planetary assembly including a sun gear, a ring gear, a planet unit and a brake for one of said elements, a reversing gear unit arranged at the output end of said concentric shafts, an output shaft driven from said concentric shafts and said reversing gear unit, clutch units axially arranged with respect to the input shaft and said concentric shafts and transmitting power from the input shaft to the several concentric shafts, said clutch units each including a friction plate, a backing plate and a sliding clutch plate, each sliding clutch plate including a hollow hub structure, an annular piston fixed on each concentric shaft and rotating within said hollow hub, a sliding cylinder member arranged within the hub and engaging the latter to shift the same into engagement with the clutch plate, said cylinder member having diaphragms arranged at each side of the fixed piston, the diaphragms being concave and being sealed at their inner and outer peripheral edges to form fluid chambers normally connected with the low pressure side of said pump, means for applying high pressure within one of the concave diaphragms to shift the cylinder for moving the sliding clutch plate into clutch engaging position, fluid means for actuating the reversing gear unit, and means applying fluid to the fluid actuating means of the reversing gear unit selectively with each of the high pressure fluid clutches.

CARL EINAR SCHOU.

REFERENCES CITED

The following references are of record in the file of this patent:

UNITED STATES PATENTS

| Number | Name | Date |
|---|---|---|
| 813,461 | Stacks | Feb. 27, 1906 |
| 1,577,004 | Turney | Mar. 16, 1926 |
| 2,112,487 | Freeborn | Mar. 28, 1938 |
| 2,161,702 | Durig | June 6, 1939 |
| 2,193,305 | Thompson | Mar. 12, 1940 |
| 2,259,730 | Burtnett | Oct. 21, 1941 |
| 2,321,672 | Hall et al. | June 15, 1943 |
| 2,406,225 | Kelbel | Aug. 20, 1946 |